UNITED STATES PATENT OFFICE.

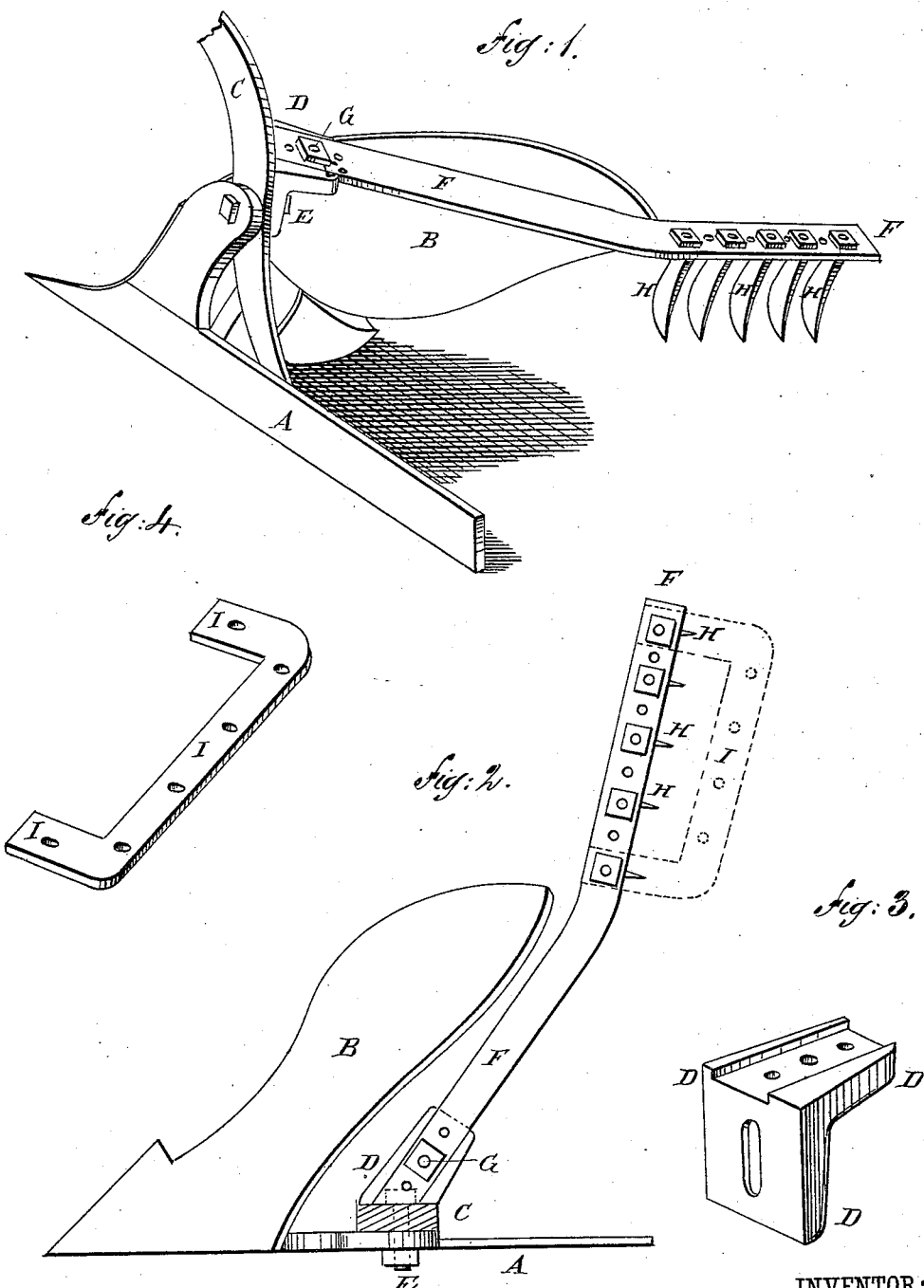

ENOCH CALVIN EATON, OF PINCKNEYVILLE, ILLINOIS.

HARROW ATTACHMENT FOR PLOWS.

SPECIFICATION forming part of Letters Patent No. 304,510, dated September 2, 1884.

Application filed August 6, 1883. (No model.)

*To all whom it may concern:*

Be it known that I, ENOCH CALVIN EATON, of Pinckneyville, in the county of Perry and State of Illinois, have invented a new and useful Improvement in Harrow Attachments for Plows, of which the following is a full, clear, and exact description.

Reference is to be had to the accompanying drawings, forming a part of this specification, in which similar letters of reference indicate corresponding parts in all the figures.

Figure 1 is a perspective view of my improvement, shown as applied to a plow, part of the plow-beam being broken away. Fig. 2 is a plan view of the same, the plow-beam being shown in section. Fig. 3 is a perspective view of the angular coupling-iron. Fig. 4 is a perspective view of an additional tooth-bar.

The object of this invention is to provide convenient and effective harrow attachments for plows to pulverize and level the soil as it is turned by the said plows.

A represents the landside, B the mold-board, and C the beam, of an ordinary plow.

D is an angular coupling-iron, one arm of which is so formed as to fit against the plow-beam C in the rear of the upper part of the inner end of the mold-board B, where it is secured in place by a bolt, E. The lower arm of the coupling-iron D is slotted vertically to receive the bolt E, so that the said coupling-iron and its attachments can be raised and lowered, as may be required; also, whereby said bar F (with its attached teeth) may be adjusted around its own axis, or rather around the point of attachment to the beam, for the purpose of varying the pitch of the teeth, as required for different conditions of the soil. The attachment of the coupling D to the beam in rear of the mold-board is also important in respect to co-action with the plow, for in any other location of the coupling the plow is tilted laterally and affected by side draft, or otherwise rendered more unsteady by working of the teeth in the soil. The upper arm of the angular coupling-iron D projects parallel with the mold-board B, and is grooved upon its upper side to receive the inner end of the bar F, so that the said bar can be secured in place by a single bolt, G. Several holes are formed in the end of the bar F to receive the bolt G, so that the said bar can be moved in or out, as may be required. The bar F passes back in the rear of the upper part of the mold-board B, and extends the width of a furrow-slice, more or less, beyond the outer end of the said mold-board B. In the projecting part of the bar F are formed a number of holes to receive the shanks of the harrow-teeth H, which are secured in place by nuts screwed upon their upper ends. More or fewer harrow-teeth H can be used, as the character of the soil may require, and the said teeth may be made in sword form, as shown in Fig. 1, in the form of ordinary harrow-teeth, or in any other desired form.

I is a U-shaped bar, the ends of which are designed to be bolted to the bar F by means of the shanks and nuts of two harrow-teeth, H, or by separate bolts, as may be most convenient. In the body of the bar I are formed a number of holes to receive harrow-teeth. The bar I and its teeth are designed to be used when the soil is required to be more finely pulverized than can be done by the teeth attached to the bar F.

With this construction the harrow is rigidly attached to the plow-beam, so that it will pulverize and level the soil, cutting down the high parts of the furrow-slice and filling the low places, so as to leave the soil in good condition for subsequent operations.

Having thus described my invention, I claim as new and desire to secure by Letters Patent—

The combination, with a turn-plow, of an obtuse-angled bar, F, carrying teeth H on its outer arm, and a bar, I, bent at both ends, said bar I being also provided with teeth adapted to work rearwardly between the teeth of bar H, as and for the purpose specified.

ENOCH CALVIN EATON.

Witnesses:
P. ALTIMUS,
FRANK M. ROE.